Sept. 27, 1949. W. H. HOWE 2,483,300
INTERCHANGEABLE ELECTRICAL
CONDITION RESPONSIVE UNIT
Filed June 6, 1945

INVENTOR
Wilfred H. Howe
BY
Blair, Curtis + Hayward
ATTORNEYS

Patented Sept. 27, 1949

2,483,300

UNITED STATES PATENT OFFICE 2,483,300

INTERCHANGEABLE ELECTRICAL CONDITION RESPONSIVE UNIT

Wilfred H. Howe, Sharon, Mass., assignor to The Foxboro Company, Foxboro, Mass., a corporation of Massachusetts Application June 6, 1945, Serial No. 597,819

22 Claims. (Cl. 73—398)

This invention relates to standardized interchangeable electrical condition responsive units in which the responsive elements are electrical resistance type strain gages; and more particularly to units of this type for measuring differential pressure, and to such units for making a plurality of measurements accurately and rapidly at numerous measuring points with any standardized measuring instruments without the need for continuously adjusting such instruments to match the condition responsive units.

In accordance with the present invention it is possible to accurately measure the values of the conditions to which a number of condition sensitive strain gage units are exposed with any standardized measuring instrument without the necessity for adjusting the measuring instrument to the individual characteristics of each sensitive unit before each measurement is made, and to provide each of such units in a standard unitary structural form of uniform characteristic such that a plurality of such units can be readily and interchangeably connected to the measuring instrument by multiple-pole switch structures or separable plug connectors without affecting the accuracy of measurement. Although in strain gage measurements of the type contemplated in the present invention, attempts have been made to compensate for certain of the inherent variables in strain gage elements which prevented such interchangeability of such condition sensitive units, up to the present time such attempts have not been entirely successful. In order to compensate for changes in resistance of the strain gage elements caused by changes in their ambient temperature, and also in order to multiply their sensitivity, it has been usual to use four substantially identical strain gage elements connected in a Wheatstone bridge type circuit. Two of these elements are arranged so as to be responsive to the strain being measured and are connected in two opposite arms of the bridge circuit, and the other two are arranged in close proximity to the first two so as to be exposed to the same ambient temperature but not subjected to any strain and are connected in the other two opposite arms of the bridge; as shown, for example, in the copending application of Albert Allen, Serial No. 543,089, which has become abandoned. Such an arrangement effectively compensates for changes in bridge unbalance caused by changes in the resistance of the strain gage elements due to changes in their ambient temperature because the two temperature compensating resistors provide an equal and opposite effect. Furthermore, increased sensitivity is obtained with this arrangement because the two strain-sensitive elements are in opposite arms of the bridge, thus acting additively to provide a double unbalance effect for any strain condition. A change in the condition of balance of the bridge circuit, due to change in resistance of the two strain sensitive elements caused by change in the strain of those elements, may be measured by any suitable bridge balance measuring arrangement, or by a "double bridge" measuring arrangement such as that shown in my copending application Serial No. 496,438. In addition to providing a convenient measuring instrument, this "double bridge" circuit arrangement also minimizes the effect of circuit resistance changes caused by variation in switch contact resistance and the like. However, none of these arrangements permits the provision of completely interchangeable sensitive units because of other variations inherent in the structure of such units. Such variations are due to differences in the precise dimensions and the modulus of elasticity of the material of one unit as compared with that of another, by changes in this modulus with changes in temperature, by differences in the specific sensitivity between units, by differences in the zero balance values, and the like. These variations prevent such arrangements from providing absolutely uniform measurements from a plurality of such condition sensitive units, or with a single unit from a plurality of measuring instruments, unless all of the strain gage elements are carefully matched, and matched to the measuring instrument; or unless the measuring instrument is adjusted to the individual characteristics of each condition sensitive unit after it is connected to the measuring instrument but before a measurement of that unit is made. In accordance with the present invention such complete interchangeability is accomplished by the provision in the condition responsive unit of standardizing resistance units of special characteristics which adjust and compensate for the idiosyncrasies and variations in characteristics inherent in the electrical and mechanical characteristics of the individual strain gage elements.

Further, in accordance with the present invention, it is possible to measure the pressure in a container, or to measure differential pressure, by means of such resistance type strain gage responsive units. This is accomplished by measuring the strain in a member, strained by application of the pressure to be measured, by means of an electrical strain gage attached to this member. Such a pressure responsive device may be in the form of the tubular structure shown in my copending application, Serial No. 549,532, i. e. a tube around which is spirally wound a wire whose electrical resistance varies in accordance with its strain. This wire is affixed to the surface of the tube in some suitable manner, such, for example, as by being firmly bonded thereto with some cementing substance, or by being wound thereon in a strained condition, as described in my above-mentioned copending application. In such a device the stress induced in the tubular member due to the application of a differential pressure between the inside and the outside thereof causes the tube, and therefore the wire due to its mechanical attachment to the surface of the tube, to be strained, thus changing the resistance of the wire. This permits measurement of differential pressure across the tube with any well-known resistance measuring means by measuring the change of resistance of the wire. Further, in accordance with the present invention, multiple pressure measurements may be made with any standardized measuring instrument and a plurality of such pressure sensitive units.

Accordingly, therefore, it is an object of this invention to provide electrically uniform resistance strain gage type condition responsive units provided with standardizing and compensating elements so that such units are completely interchangeable, and which permit any standardized indicating, controlling, and/or recording instrument to operate interchangeably and uniformly with any such condition sensitive unit. It is another object of this invention to provide such units which are responsive to differential pressures, and which may be constructed to have a standardized and uniform response characteristic throughout all ranges of normal operating temperatures.

These and other apparent objects and advantages of this invention are obtained by the means described in the following specification and may be more readily understood by reference to the accompanying drawings wherein.

Figure 4:
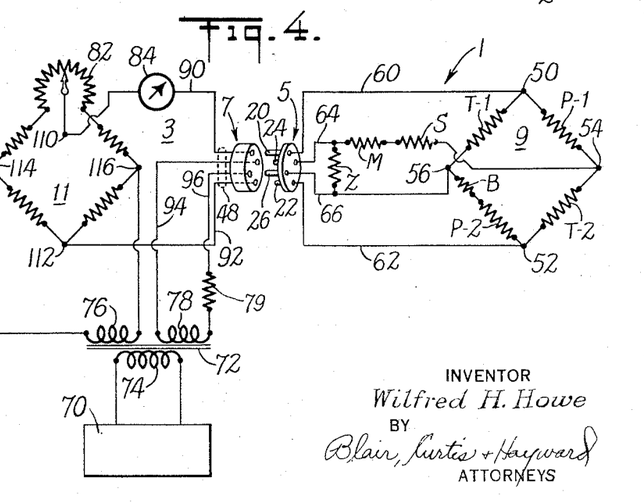
Figure 4 is the schematic wiring diagram of a suitable electrical instrument for determining the response of the pressure sensitive unit shown in Figure 1.

The various features of the invention can be most readily described by reference to Figure 4 of the drawings which shows the wiring diagram of a differential pressure responsive system embodying the invention. This system comprises an interchangeable pressure responsive unit, generally indicated at 1, and a bridge-balance measuring device, generally indicated at 3, interconnected by a detachable connector arrangement comprising a separable connector plug, generally indicated at 5, and a corresponding receptacle, generally indicated at 7. The interchangeable pressure responsive unit 1 includes eight resistor units P—1, P—2, T—1, T—2, B, S, M and Z, which are interconnected, as shown in Figure 4, to form a Wheatstone bridge type circuit, generally indicated at 9, having four terminals 50, 52, 54 and 56 connected by leads 60, 62, 64 and 66, respectively, to the proper pins 20, 22, 24 and 26, respectively, on plug 5, so that when plug 5 is inserted in receptacle 7 the bridge 9 is excited through leads 64 and 66 and its condition of balance is determined by measurement between leads 60 and 62. Resistors P—1 and P—2 are resistance type strain gage elements applied in the manner hereinafter to be described to a mechanical structure adapted to be strained by application thereto of the pressure to be measured whereby the strain indicated by the strain gage elements is a measure of this pressure. These two pressure responsive strain gage resistors P—1 and P—2 are connected in opposite arms of the bridge 9 between the terminals 50 and 54, and 52 and 56, respectively. A change in the pressure to be measured changes the resistance of resistors P—1 and P—2 in the same direction and, because they are positioned in opposite arms of the bridge 9, this causes the change in the condition of balance of the bridge 9 to be double the amount that would result from the use of only one such resistors. Thus this circuit arrangement effectively doubles the sensitivity of the apparatus.

Resistors T—1 and T—2 are temperature compensating resistors which are substantially identical in dimensions, material, resistance, and resistance-temperature coefficient to the pressure responsive resistors P—1 and P—2; and they are mounted in such close proximity to resistors P—1 and P—2 as to be exposed to substantially the same temperature. These two temperature compensating resistors T—1 and T—2 are connected in the other two opposite arms of the bridge circuit 9 between the terminals 50 and 56 and 52 and 54, respectively, so that any unbalance of bridge circuit 9, caused by change in resistance of resistors P—1 and P—2 due to change in their ambient temperature, is exactly compensated for by an equal change of resistance of the resistors T—1 and T—2, which change affects the condition of balance of bridge 9 in an equal and opposite manner.

Because it is impossible in practice to construct four resistors P—1, P—2, T—1 and T—2 which are exactly identical in electrical and mechanical characteristics, a bridge balancing resistor B is provided connected in one arm of the bridge 9. This resistor B is of such value and is connected in such arm of the bridge 9, e. g. in the arm of the bridge 9 between its terminals 52 and 56 in series with pressure responsive resistor P—2 as shown in the drawings, so as to bring the bridge circuit 9 into balance at some base pressure value such as a condition of zero pressure applied to the pressure responsive resistors P—1 and P—2. In order that this bridge balancing resistor B will maintain the bridge 9 in balance at a condition of zero pressure regardless of the ambient temperature of the pressure responsive unit 1, this resistor B is made of material and in a manner substantially identical to that of resistors P—1, P—2, T—1 and T—2, so that it has substantially the same thermal and electrical resistance characteristics.

Changes in the temperature of the pressure responsive unit 1 may affect the modulus of elasticity of the mechanical structures on which the pressure responsive resistors P—1 and P—2 are mounted. Such changes affect the uniformity of the response of the unit 1. Since the modulus of elasticity of most materials tend to decrease with increases of temperature, with the pressure responsive unit in accordance with the present invention, a given pressure change tends to produce a larger strain at higher temperatures. In order to eliminate this disadvantageous effect, a modulus compensating resistor M is provided. This resistor M is made of a material having a relatively high temperature-resistance coefficient so that its resistance tends to increase with temperature, it is mounted in close proximity to the remainder of the resistors in the bridge circuit 9 so that its temperature corresponds substantially with the temperature of the structures on which these resistors are mounted, and it is connected in one of the leads which supplies the excitation to the bridge circuit 9, e. g. in lead 64 connected to terminal 54 as shown in Figure 4. With this arrangement, any increase in temperature of the pressure responsive unit 1 causes a corresponding increase in the resistance of this modulus compensation resistor M and thus tends to decrease the excitation voltage applied to the bridge circuit 9. This action renders the bridge circuit less sensitive at higher ambient temperatures so that a given pressure change at a higher temperature produces the same bridge unbalance voltage that the same pressure change would produce at a lower temperature. By careful selection of the temperature-resistance coefficient and the resistance value of resistor M, this decrease in sensitivity, i. e. decrease in bridge excitation, can be made to exactly offset the increase in sensitivity of the pressure responsive units, i. e. resistors P—1 and P—2, caused by the decrease in the modulus of elasticity of their mechanical mounting structures due to increase in their ambient temperature. Changes in the sensitivity, i. e. the change in the bridge unbalance condition caused by a given change in the pressure applied to pressure responsive resistors P—1 and P—2, of individual pressure responsive units may result from such things as small variations in the dimensions of the mechanical structures on which the pressure responsive strain gage elements P—1 and P—2 are mounted, small differences in the sensitivity of the individual strain gage elements themselves, small differences in the overall impedance of the individual bridge circuits due to difference in temperature compensating resistance values, and the like. In order to eliminate such variations in sensitivity between various pressure responsive units, a resistor S is provided in each unit to set the overall sensitivity of the unit to some predetermined value which is a standard for all units. This resistor S is connected in series in one of the leads that supplies excitation to the bridge circuit 9, e. g. in lead 64 connected to terminal 54 in series with resistor M, and its value of resistance is so chosen that the bridge excitation is just sufficient to provide the desired sensitivity. The specified standard sensitivity for all interchangeable pressure units is set at a sufficiently low value so that it is possible to obtain this specified sensitivity on all units by suitable choice of the values of sensitivity control resistors S.

The resistor Z, which is connected across the excitation leads to the bridge, e. g. between leads 64 and 66 connected to terminals 54 and 56, respectively, of the bridge circuit 9, is provided as an impedance matching resistor to maintain the apparent resistance between the bridge excitation terminals at some value which is standard for all interchangeable pressure responsive units. The value of this resistor Z is so chosen that it reduces the input resistance across the excitation terminals of such interchangeable pressure responsive units to some suitable standard value.

Although the bridge circuit 9 of the pressure responsive unit 1, just described, may be excited in any suitable manner either from an A. C. or a D. C. source, and although its condition of balance may be determined by any suitable means, it has been found preferable to excite such a bridge from an A. C. source of power and to measure its condition of balance by means of a balancing bridge connected in a "double bridge" circuit as described in my copending application Serial No. 496,438. In a measuring system of the type contemplated by the present invention, using a plurality of interchangeable condition sensitive elements of the type herein described, connected to the measuring instrument by separable plug connectors wherein variable contact resistance effects may be encountered, the "double bridge" type system has particular advantages as pointed out in the above-mentioned copending application. Referring to Figure 4, a simplified "double-bridge" measuring instrument is generally indicated at 3. This comprises a suitable source of A. C. potential 70, such, for example, as a vacuum tube oscillator, operating at some suitable frequency, such, for example, as 1000 cycles, which, through a transformer 72 having a single primary winding 74, connected to the A. C. power source 70, and two substantially identical secondary windings 76 and 78, excites the bridge circuit 9 of pressure responsive unit 1 and a balancing bridge circuit, generally indicated at 11, which is adapted to be unbalanced in any predetermined amount by operation of a slide wire 82. The secondary winding 76 is connected to the excitation terminals 114, 116 of the balancing bridge 11, and the other secondary winding 78 of transformer 72 is connected through leads 94 and 96 of cable 48, plug receptacle 7, pins 24 and 26 in plug 5, to leads 64 and 66, respectively, to excite the bridge circuit 9 of the pressure responsive unit 1. A matching resistor 79 is connected in lead 96 to permit the excitation voltages of the two bridges 9 and 11 to be set at the proper ratio determined by the calibration of the slidewire 82. The balance detecting terminals 50 and 52 of the bridge circuit 9 in the responsive unit 1 are connected through leads 60 and 62, pins 20 and 22 in plug 5, receptacle 7 and leads 90 and 92 of cable 48 to the balance terminals 110 and 112 of balancing bridge 11 through a null indicator device 84. With this arrangement, any unbalance in bridge 9 of pressure responsive unit 1 produced by changes in the pressure applied to this unit, is measured by adjusting the balancing bridge 11 to an equal and opposite condition of unbalance so that the indicator 84 indicates a null condition. Under such circumstances, the amount of adjustment of the slidewire 82 is a direct measure of the pressure applied to the pressure responsive unit 1. In accordance with the present invention, any number of standardized pressure responsive units of the type herein described may be interchangeably connected to the measuring instrument 3 through the separable plug receptacle 7 and a direct reading of the pressure to which they are exposed may be made by reading of the position of slidewire 82, and this may be accomplished without the need for any preliminary adjustments of the measuring instrument 3 to adapt it to the individual characteristics of the individual pressure responsive units so connected.

Figure 1:
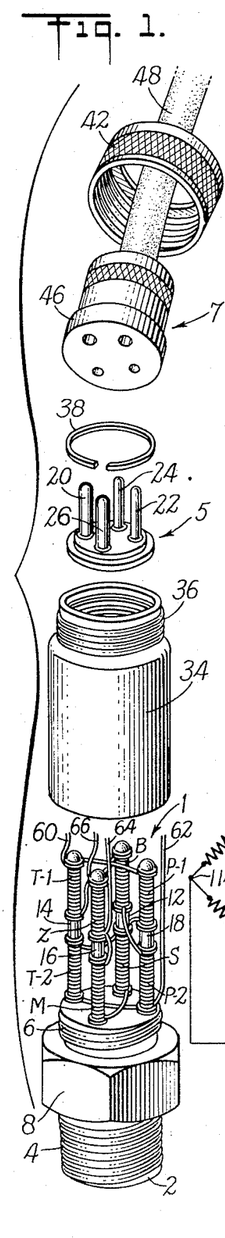
Figure 1 is an exploded view in perspective of a standardized differential pressure responsive unit provided with a separable plug connector permitting it to be interchanged with other such units, all in accordance with the present invention.
Figures 2, 3:
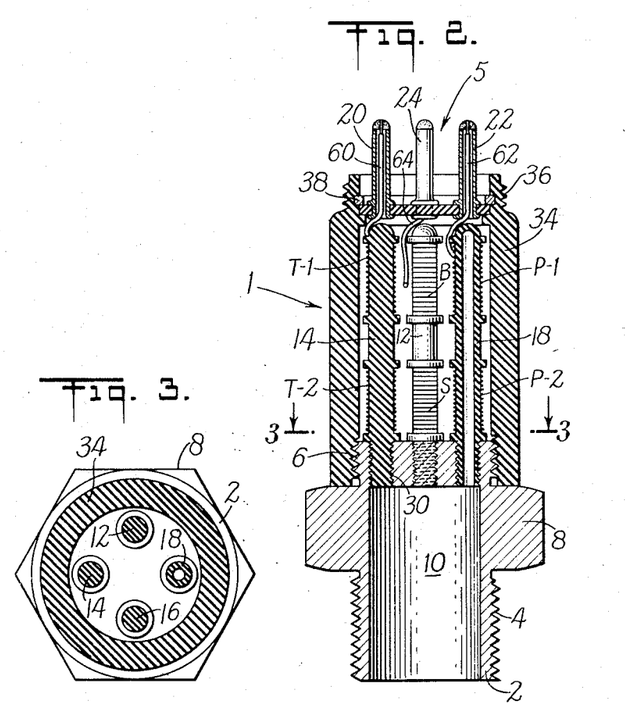
Figure 2 is a vertical cross section of the pressure responsive unit shown in Figure 1.
Figure 3 is a section taken on line 3—3 of Figure 2.

Referring now to Figures 1, 2 and 3 of the drawings, there is shown therein a standardized interchangeable differential pressure responsive unit which incorporates the features of the invention described above in connection with the wiring diagram shown in Figure 4. This arrangement illustrates one form in which a standardized and interchangeable condition sensitive element may be made in a simple and compact unitary structure which may be quickly and easily associated or disassociated both with the condition being measured and the measuring instrument used for indicating, recording and/or controlling the value of this condition. This differential pressure responsive unit is provided with a hollow cylindrical base member, generally indicated at 2, externally threaded at one end 4 and at the other end 6, and provided with a hexagonal shoulder portion 8. The threaded end 4 is adapted to be screwed into a suitably tapped hole (not shown) in any container in which the pressure is to be measured, as, for example, into the spark plug hole of an internal combustion engine cylinder block wherein it may be firmly seated by application of a wrench to the hexagonal shoulder portion 8. A cylindrical cavity is provided in the base 2 extending longitudinally therein from the end 4 to form a hollow pressure chamber, generally indicated at 10, which, when the pressure unit is attached to a container in the manner above-mentioned, communicates with the interior of such container. Three solid rod-like members or posts 12, 14 and 16, and a hollow or tubular member 18, are fastened to the end 6 of the base 2 in some suitable manner as by being threaded into holes 30 so as to be parallel to each other and project longitudinally therefrom. The free end of the tubular member 18 is closed, as shown in Figure 2, so that it effectively becomes an extension of the pressure chamber 10. Two strain-sensitive resistance elements P—1 and P—2 are wrapped around the tubular member 18, as by spirally winding around tubular member 18 two continuous filaments of a material whose electrical resistance varies in accordance with its strain and firmly affixing these filaments to the outer surface of this tubular member 18, for example, in the manner described in my copending application Serial No. 549,532. With this arrangement, when pressure is applied to the interior of pressure chamber 10, and thus to the interior of the tubular member 18, i. e., when a differential pressure is applied across the inside and the outside walls of the tubular member 18, a stress is developed in its walls causing them to be strained. This strains the wires in resistors P—1 and P—2, causing them to change their resistance. This change in resistance is a measure of the differential pressure applied to the tubular member 18. Although this change in resistance of the strain sensitive resistance elements P—1 and P—2 can be measured in any suitable manner, this is preferably accomplished in a manner hereinbefore described.

Two other resistance elements T—1 and T—2, substantially identical with pressure-sensitive resistances P—1 and P—2, are wrapped around one of the posts, e. g. around post 14 as shown in the drawings. These two resistors T—1 and T—2, being substantially identical to pressure sensitive resistors P—1 and P—2, and being exposed to substantially the same temperature as these resistors, operate as temperature-compensating resistors to compensate for changes in the resistance of strain sensitive resistors P—1 and P—2 caused by changes in their temperature, in the manner described above in connection with Figure 4.

Two other resistors B and S are wrapped around one of the other posts, e. g. post 12 as shown in the drawings, the resistor B to act as a bridge-balance setting resistor, and the resistor S to act as a bridge sensitivity determining resistor for the purposes described above.

The two other resistors M and Z are wrapped around the remaining post 16. The resistor M serves to compensate the changes in the characteristics of the pressure sensitive unit 1 caused by changes in the modulus of elasticity of the tubular member 18. The resistor Z serves to adjust the overall "look-in" impedance of the pressure responsive unit bridge circuit 9 to some predetermined standardized value, as above mentioned. All of these resistors P—1, P—2, T—1, T—2, B, S, M and Z are connected together as shown in Figure 4 to operate in a manner above-described, and the four leads 60, 62, 64 and 66 of this bridge circuit 9 are soldered to the proper terminal pins 20, 22, 24 and 26, respectively, of the connection plug member 5. This plug member 5 is attached to the base 2 to form a unitary structure therewith by a cylindrical sleeve 34, one end of which is threaded to the upper end 6 of the base 2. The other end of sleeve 34 is provided with an internal peripheral groove 36 to receive the plug assembly 5 where it is held in place by a split expansion ring 38. The unitary pressure responsive device thus formed is adapted to be connected to a measuring instrument 3 by plugging a receptacle 7 attached to a connection cable 48 on to the plug assembly 5. The plug end of the sleeve 34 is also threaded on the outside to coact with a threaded clamping collar 42 adapted to screw down on a shoulder 46 on plug receptacle 7 to hold the plug receptacle 7 firmly in contact with plug member 5 to connect the pressure responsive unit 1 to the measuring instrument 3.

The following are an example of actual values which have been found to be quite satisfactory in producing standardized interchangeable pressure responsive units of the type herein described. Resistors P—1, P—2, T—1, and T—2 were wound of approximately five inches of .001 inch O. D. constantan wire and each had a resistance of approximately 120 ohms; resistor B was wound of .005 inch O. D. constantan wire and had a resistance of less than 1 ohm; resistor S was wound of .003 inch O. D. constantan wire and had a resistance in the neighborhood of 10 ohms; resistor M was wound of .003 inch O. D. nickel wire and had a resistance of about 5 to 10 ohms; and resistor Z was wound of constantan wire of any convenient diameter and had a resistance of approximately 1000 ohms. A pressure responsive unit having a circuit with values approximating those above stated had a "look-in" impedance at its excitation terminals 64 and 66 of approximately 120 ohms. Its pressure sensitivity would be determined primarily by the material and dimensions of the tubular member 18.

Although in the pressure responsive unit embodying the invention herein described the various standardizing and compensating resistors have been shown mounted on four projections on the base 2, it is obvious to those skilled in the art that these resistors might be mounted on any number of projections and in any manner desired, providing they are all exposed to substantially the same operating temperatures and had the other necessary characteristics described above.

Since many possible embodiments might be made of the above invention, and since many changes might be made in the embodiments above set forth, all without departing from the scope of the invention, it is to be understood that all matter hereinbefore set forth or shown in the accompanying drawings is to be interpreted as illustrative only and not in a limiting sense.

I claim:

1. A strain gage type pressure responsive unit comprising, in combination, a hollow cylindrical pressure chamber having an opening in one side thereof, mounting means for attaching said pressure chamber to a container in which pressure is to be measured so that the interior of said pressure chamber communicates with the interior of said container through said opening, a solid cylindrical member of dimensions and material substantially equivalent to those of said pressure chamber mounted in close proximity thereto, four substantially identical resistance strain gage elements, two of said elements being mechanically associated with the outer surface of said pressure chamber to be strained with the walls of said chamber due to the stress produced therein caused by change in the differential pressure between the inside and the outside of said chamber to act as pressure responsive elements, the other two of said elements being associated with the outer surface of said solid member so as to be subjected to substantially the same temperature as said first two elements to act as temperature compensating elements, means connecting said four elements in a Wheatstone bridge type circuit, said two pressure responsive elements being connected in two opposite arms of said bridge circuit and said two temperature compensating elements being connected in the other two opposite arms of said bridge circuit, and means for connecting said bridge circuit to bridge balance responsive means whereby the pressure in said container may be determined by determination of the state of balance of said bridge circuit.

2. A strain gage type pressure responsive unit for measuring the pressure in a container, comprising, in combination, a base having mounting means for securing the same to close a hole in said container, a tubular member having one closed end and mounted on said base so that the hole in its other end communicates with the hole in said container, a solid cylindrical member of external dimensions and material substantially equivalent to those of the tubular member mounted on said base in close proximity to said tubular member, four continuous filaments of material whose electrical resistance varies in accordance with its strain, two of said filaments being wound spirally around and affixed to the surface of said tubular member to be strained with the walls thereof due to stress therein caused by change in the differential pressure between the inside and outside of said tubular member, the other two of said filaments being wound and affixed in a substantially identical manner to the surface of said solid member, means connecting the four resistances thus formed in a Wheatstone bridge type circuit, said first two resistances being connected in two opposite arms of said bridge circuit and said last two resistances being connected in the other two arms of said bridge circuit, and means for connecting said bridge circuit to bridge balance responsive means whereby the pressure in said container may be determined by determination of the state of balance of said bridge circuit.

3. A strain-gage-type pressure responsive unit comprising, in combination, a hollow pressure chamber having an opening in one side thereof, means for associating said pressure chamber with a container in which pressure is to be measured so that the interior of said pressure chamber communicates with the interior of said container through said opening, four substantially identical resistance-type strain-gage elements, two of said elements being affixed to the outer surface of said pressure chamber to be strained with the walls of said chamber due to the stress therein produced by change in the differential pressure between the inside and the outside of said chamber to act as pressure responsive elements, means for exposing the other two of said elements to substantially the same temperature as said first two elements to act as temperature compensating elements, means connecting said four elements in a Wheatstone bridge type circuit, said two pressure responsive elements being connected in two opposite arms of said bridge circuit and said two temperature compensating elements being connected in the other two opposite arms of said bridge circuit, a bridge balance-setting resistor of temperature-resistance characteristic substantially similar to that of said four strain gage resistance elements mounted in close proximity to said elements and connected in such arm of said bridge circuit and having such a resistance value as to balance said circuit at some predetermined pressure value in said container, and means for connecting said bridge circuit to bridge balance responsive means whereby the pressure in said container with respect to said predetermined value may be determined by the determination of the state of balance of said bridge circuit.

4. A strain-gage-type pressure responsive unit comprising, in combination, a hollow pressure chamber having an opening in one side thereof, means for associating said pressure chamber with a container in which pressure is to be measured so that the interior of said pressure chamber communicates with the interior of said container through said opening, four substantially identical resistance-type strain-gage elements, two of said elements being affixed to the outer surface of said pressure chamber to be strained with the walls of said chamber due to the stress therein produced by change in the differential pressure between the inside and the outside of said chamber to act as pressure responsive elements, means for exposing the other two of said elements to substantially the same temperature as said first two elements to act as temperature compensating elements, means connecting said four elements in a Wheatstone bridge type circuit, said two pressure responsive elements being connected in two opposite arms of said bridge circuit and said two temperature compensating elements being connected in the other two opposite arms of said bridge circuit, a resistor having a relatively high temperature-resistance coefficient mounted in said unit in close proximity thereto and exposed to substantially the same temperature as said strain gage elements connected in series with one of the excitation terminals of said bridge circuit and having such a resistance value and temperature-resistance coefficient as to compensate for changes in sensitivity of said pressure responsive unit caused by changes in modulus of elasticity of the material of said pressure chamber due to changes in its temperature, and means for connecting said bridge circuit to bridge balance responsive means whereby the state of balance of said bridge circuit is uniformly responsive to the pressure in said container for all operating temperatures.

5. A strain-gage-type pressure responsive unit comprising, in combination, a hollow pressure chamber having an opening in one side thereof, means for associating said pressure chamber with a container in which pressure is to be measured so that the interior of said pressure chamber communicates with the interior of said container through said opening, four substantially identical resistance-type strain-gage elements, two of said elements being affixed to the outer surface of said pressure chamber to be strained with the walls of said chamber due to the stress therein produced by change in the differential pressure between the inside and the outside of said chamber to act as pressure responsive elements, means for exposing the other two of said elements to substantially the same temperature as said first two elements to act as temperature compensating elements, means connecting said four elements in a Wheatstone bridge type circuit, said two pressure responsive elements being connected in two opposite arms of said bridge circuit and said two temperature compensating elements being connected in the other two opposite arms of said bridge circuit, a bridge balance-setting resistor of temperature-resistance characteristics substantially similar to that of said four strain gage resistance elements mounted in close proximity to said elements and connected in such arm of said bridge circuit and having such a resistance value as to balance said circuit at some predetermined pressure value in said container, a resistor having a relatively high temperature-resistance coefficient mounted in said unit in close proximity thereto and exposed to substantially the same temperature as said strain gage elements connected in series with one of the excitation terminals of said bridge circuit and having such a resistance value and temperature resistance coefficient as to compensate for changes in sensitivity of said pressure responsive unit caused by changes in modulus of elasticity of the material of said pressure chamber due to changes in its temperature, and means for connecting said bridge circuit to bridge balance responsive means whereby the state of balance of said bridge circuit is uniformly responsive to the pressure in said container with respect to said predetermined value for all operating temperatures.

6. A strain-gage-type pressure responsive unit for measuring the pressure in a container, comprising, in combination, a base having mounting means for securing the same to close a hole in said container, a tubular member having one closed end mounted on said base so that the hole in its other end communicates with the hole in said container, a plurality of solid cylindrical members of external dimensions and material substantially equivalent to those of the tubular member mounted on said base in close proximity to said tubular member, four continuous filaments of material whose electrical resistance varies in accordance with its strain, two of said filaments being wound spirally around and affixed to the surface of said tubular member to be strained with the walls thereof due to stress therein caused by change in the differential pressure between the inside and outside of said tubular member, the other two of said filaments being wound and affixed in a substantially identical manner to the surface of one of said solid members, means connecting the four resistors thus formed in a Wheatstone bridge type circuit, said first two resistors being connected in two opposite arms of said bridge circuit and said last two resistors being connected in the other two arms of said bridge circuit, a bridge balance-setting resistor of temperature-resistance characteristic substantially similar to that of said four strain gage resistors spirally wound on one of said solid cylindrical members and connected in such arm of said bridge circuit and having such a resistance value as to balance said circuit at some predetermined pressure value in said container, and means for connecting said bridge circuit to bridge balance responsive means whereby the pressure in said container may be determined with respect to said predetermined value by determination of the state of balance of said bridge circuit.

7. A strain-gage-type pressure responsive unit for measuring the pressure in a container, comprising, in combination, a base having mounting means for securing the same to close a hole in said container, a tubular member having one closed end mounted on said base so that the hole in its other end communicates with the hole in said container, a plurality of solid cylindrical members of external dimensions and material substantially equivalent to those of the tubular member mounted on said base in close proximity to said tubular member, four continuous filaments of material whose electrical resistance varies in accordance with its strain, two of said filaments being wound spirally around and affixed to the surface of said tubular member to be strained with the walls thereof due to stress therein caused by change in the differential pressure between the inside and outside of said tubular member, the other two of said filaments being wound and affixed in a substantially identical manner to the surface of one of said solid members, means connecting the four resistors thus formed in a Wheatstone bridge type circuit, said first two resistors being connected in two opposite arms of said bridge circuit and said last two resistors being connected in the other two arms of said bridge circuit, a resistor having a relatively high temperature-resistance coefficient spirally wound on one of said solid cylindrical members so as to be exposed to substantially the same temperature as said strain gage resistors, connected in series with one of the excitation terminals of said bridge circuit and having such a resistance value and temperature-resistance coefficient as to compensate for changes in sensitivity of said pressure responsive unit caused by changes in modulus of elasticity of the material of said tubular member due to changes in its temperature, and means for connecting said bridge circuit to bridge balance responsive means whereby the state of balance of said bridge circuit is uniformly responsive to the pressure in said container for all operating temperatures.

8. A strain-gage-type pressure responsive unit for measuring the pressure in a container, comprising, in combination, a base having mounting means for securing the same to close a hole in said container, a tubular member having one closed end mounted on said base so that the hole in its other end communicates with the hole in said container, a plurality of solid cylindrical members of external dimensions and material substantially equivalent to those of the tubular member mounted on said base in close proximity to said tubular member, four continuous filaments of material whose electrical resistance varies in accordance with its strain, two of said filaments being wound spirally around and affixed to the surface of said tubular member to be strained with the walls thereof due to stress therein caused by change in the differential pressure between the inside and outside of said tubular member, the other two of said filaments being wound and affixed in a substantially identical manner to the surface of one of said solid members, means connecting the four resistors thus formed in a Wheatstone bridge type circuit, said first two resistors being connected in two opposite arms of said bridge circuit and said last two resistors being connected in the other two arms of said bridge circuit, a bridge balance-setting resistor of temperature resistance characteristic substantially similar to that of said four strain gage resistors spirally wound on one of said solid cylindrical members and connected in such arm of said bridge circuit and having such a resistance value as to balance said circuit at some predetermined pressure value in said container, a resistor having a relatively high temperature-resistance coefficient spirally wound on one of said solid cylindrical members so as to be exposed to substantially the same temperature, connected in series with one of the excitation terminals of said bridge circuit and having such a resistance value and temperature resistance coefficient as to compensate for changes in sensitivity of said pressure responsive unit caused by changes in modulus of elasticity of the material of said tubular member due to changes in its temperature, and means for connecting said bridge circuit to bridge balance responsive means whereby the state of balance of said bridge circuit is uniformly responsive to the pressure in said container with respect to said predetermined value for all operaitng temperatures.

9. A standard interchangeable strain-gage-type pressure responsive unit for measuring the pressure in a container, comprising, in combination, a base having mounting means for securing the same to close a hole in said container, a tubular member having one closed end mounted on said base so that the hole in its other end communicates with the hole in said container, a plurality of solid cylindrical members of external dimensions and material substantially equivalent to those of the tubular member mounted on said base in close proximity to said tubular member, four continuous filaments of material whose electrical resistance varies in accordance with its stain, two of said filaments being wound spirally around and affixed to the surface of said tubular member to be strained with the walls thereof due to stress therein caused by change in the differential pressure between the inside and outside of said tubular member, the other two of said filaments being wound and affixed in a substantially identical manner to the surface of one of said solid members, means connecting the four resistors thus formed in a Wheatstone bridge type circuit with the two opposite corners forming the excitation terminals and the other two opposite corners forming the balance-detecting terminals of said bridge circuit, said first two resistors being connected in two opposite arms of said bridge circuit and said last two resistors being connected in the other two arms of said bridge circuit, a bridge-balance-setting resistance element of temperature-resistance coefficient substantially equivalent to that of said strain gage resistors spirally wound on one of said solid cylindrical members and connected in such arm of said bridge circuit and having such a value of resistance that said circuit is balanced at some predetermined base pressure in said container, an impedance-matching resistance element spirally wound on one of said solid cylindrical members and connected across the excitation terminals of said bridge circuit and having its resistance value so selected as to provide standard predetermined look-in impedance to said bridge circuit from a source of excitation, a sensitivity-determining resistance element formed of material having a resistance-temperature coefficient of substantially zero value spirally wound on one of said solid cylindrical members and connected in series with one of the excitation terminals of said bridge circuit between it and said impedance-matching resistance element and having a value of resistance so selected as to provide a predetermined bridge unbalance for a predetermined pressure value in said container, and detachable connection means for connecting said pressure responsive unit to a bridge balance determining device, whereby such a standard bridge balance device may be responsive to the pressures affecting many such pressure responsive units with respect to their predetermined base pressures without the need for adjusting said bridge balance device to the individual characteristics of each of said pressure responsive units when connected thereto.

10. A standardized interchangeable strain-gage-type pressure responsive unit, comprising, in combination, a hollow pressure chamber having an opening in one side thereof, mounting means for associating said pressure chamber with a container in which pressure is to be measured so that the interior of said pressure chamber communicates with the interior of said container through said opening, four substantially identical resistance-type strain-gage elements, two of said elements being affixed to the outer surface of said pressure chamber to be strained with the walls of said chamber due to the stress therein produced by change in the differential pressure between the inside and the outside of said chamber to act as pressure responsive elements, means affixing the other two of said elements to said mounting means to expose them to substantially the same temperature as said first two elements to act as temperature compensating elements, means connecting said four elements in a Wheatstone bridge type circuit with two opposite corners forming the excitation terminals and the other two opposite corners forming the balance detecting terminals of said bridge circuit, said two pressure responsive elements being connected in two opposite arms of said bridge circuit and said two temperature compensating elements being connected in the other two opposite arms of said bridge circuit, bridge-balance-setting resistance means of temperature-resistance coefficient substantially equivalent to that of said strain gage elements affixed to said mounting means and connected in such arm of said bridge circuit and having such value of resistance that said circuit is balanced at some predetermined base pressure in said container, impedance-matching resistance means affixed to said mounting means and connected across the excitation terminals of said bridge circuit and having its resistance value so selected as to provide standard predetermined look-in impedance to said bridge circuit from a source of excitation, sensitivity-determining resistance means formed of material having a resistance-temperature coefficient of substantially zero value affixed to said mounting means and connected in series with one of the excitation terminals of said bridge circuit between it and said impedance-matching resistance means and having a value of resistance so selected as to provide a predetermined bridge unbalance for a predetermined pressure value in said container, and detachable connection means for connecting said pressure responsive unit to a bridge balance determining device, whereby such a standard bridge balance device may be responsive to the pressures affecting many such pressure responsive units with respect to their predetermined base pressures without the need for adjusting said bridge balance device to the individual characteristics of each of said pressure responsive units when connected thereto.

11. A standardized interchangeable strain-gage-type pressure responsive unit comprising, in combination, a hollow pressure chamber having an opening in one side thereof, mounting means for associating said pressure chamber with a container in which pressure is to be measured so that the interior of said pressure chamber communicates with the interior of said container through said opening, four substantially identical resistance-type strain-gage elements, two of said elements being mechanically associated with the outer surface of said pressure chamber to be strained with the walls of said chamber due to the stress therein produced by change in the differential pressure between the inside and the outside of said chamber to act as pressure responsive elements, means affixing the other two of said elements to said mounting means to expose them to substantially the same temperature as said first two elements to act as temperature compensating elements, means connecting said four elements in a Wheatstone bridge type circuit with two opposite corners forming the excitation terminals and the other two opposite corners forming the balance detecting terminals of said bridge circuit, said two pressure responsive elements being connected in two opposite arms of said bridge circuit and said two temperature compensating elements being connected in the other two opposite arms of said bridge circuit, bridge-balance-setting resistance means of temperature-resistance coefficient substantially equivalent to that of said strain gage elements affixed to said mounting means and connected in such arm of said bridge circuit and having such value of resistance that said circuit is balanced at some predetermined base pressure in said container, impedance-matching resistance means connected across the excitation terminals of said bridge circuit and having its resistance value so selected as to provide standard predetermined look-in impedance to said bridge circuit from a source of excitation, sensitivity-determining resistance means formed of material having a resistance-temperature coefficient of substantially zero value connected in series with one of the excitation terminals of said bridge circuit between it and said impedance-matching resistance means and having a value of resistance so selected as to provide a predetermined bridge unbalance for a predetermined pressure value in said container, resistance means having a relatively high temperature-resistance coefficient affixed to said mounting means to be exposed to substantially the same temperature as said strain gage elements connected in series between said sensitivity-determining means and one of the excitation terminals of said bridge and having a resistance value and temperature-resistance coefficient selected so as to compensate for changes in sensitivity of said pressure responsive unit caused by changes in modulus of elasticity of the material of said pressure chamber due to changes in its temperature, and detachable connection means for connecting said interchangeable pressure responsive unit to a bridge balance determining device whereby such a standard bridge balance device, may be responsive to the pressures affecting many such pressure responsive units uniformly throughout all operating temperatures with respect to their predetermined base pressures without the need for adjusting said bridge balance device to the individual characteristics of each of such pressure responsive units when connected thereto.

12. A standard interchangeable strain-gage-type pressure responsive unit for measuring the pressure in a container, comprising, in combination, a base having mounting means for securing the same to close a hole in said container, a tubular member having one closed end mounted on said base so that the hole in its other end communicates with the hole in said container, a plurality of solid cylindrical members of external dimensions and material substantially equivalent to those of the tubular member mounted on said base in close proximity to said tubular member, four continuous filaments of material whose electrical resistance varies in accordance with its strain, two of said filaments being wound spirally around and affixed to the surface of said tubular member to be strained with the walls thereof due to stress therein caused by change in the differential pressure between the inside and outside of said tubular member, the other two of said filaments being wound in a substantially identical manner on the surface of one of said solid members, means connecting the four resistors thus formed in a Wheatstone bridge type circuit with the two opposite corners forming the excitation terminals and the other two opposite corners forming the balance-detecting terminals of said bridge circuit, said first two resistors being connected in two opposite arms of said bridge circuit and said last two resistors being connected in the other two arms of said bridge circuit, a bridge-balance-setting resistor of temperature-resistance coefficient substantially equivalent to that of said strain gage resistors spirally wound on one of said solid cylindrical members and connected in such arm of said bridge circuit and having such a value of resistance that said circuit is balanced at some predetermined base pressure in said container, an impedance-matching resistor made of material having a resistance-temperature coefficient of substantially zero value spirally wound on one of said solid cylindrical members and connected across the excitation terminals of said bridge circuit and having its resistance value so selected as to provide standard predetermined look-in impedance to said bridge circuit from a source of excitation, a sensitivity-determining resistor made of material having a resistance-temperature coefficient of substantially zero value spirally wound on one of said solid cylindrical members and connected in series with one of the excitation terminals of said bridge circuit between it and said impedance-matching resistor and having a value of resistance so selected as to provide a predetermined bridge unbalance for a predetermined pressure value in said container, a resistor having a relatively high temperature-resistance coefficient spirally wound on one of said solid cylindrical members so as to be exposed to substantially the same temperature as said strain gage resistors connected in series with said sensitivity-determining resistor and one of the excitation terminals of said bridge and having a resistance value and temperature-resistance coefficient selected so as to compensate for changes in sensitivity of said pressure responsive unit caused by changes in modulus of elasticity of the material of said tubular member due to changes in its temperature, and detachable connection means for connecting said interchangeable pressure responsive unit to a bridge balance determining device, whereby such a standard bridge balance device may be responsive to the pressures affecting many such pressure responsive units uniformly throughout all operating temperatures with respect to their predetermined base pressures without the need for adjusting said bridge balance device to the individual characteristics of each of such pressure responsive units when connected thereto.

13. A standard interchangeable strain-gage-type pressure responsive unit for measuring the pressure in a container, comprising, in combination, a circular base having a threaded portion for screwing it into a hole in said container, a tube having one closed end passing through said base so that the hole in its other end communicates with the hole in said container and having its closed end projecting perpendicularly from said base outwardly from said container, a plurality of rods of external dimensions and material substantially equivalent to those of said tube mounted on said base in close proximity thereto and projecting perpendicularly therefrom outwardly from said container, four pieces of Constantan wire of substantially equal length and cross-section, two of said wires being wound spirally around and affixed to the surface of said tube to be strained with the walls thereof due to stress therein caused by change in differential pressure between the inside and outside of said tube, the other two of said wires being wound in a substantially identical manner on the surface of one of said rods, the four resistors thus formed being connected in a Wheatstone bridge type circuit with the two opposite terminals forming the excitation terminals and the other two opposite terminals forming the balance-detecting terminals of said bridge circuit, said first two resistors being connected in two opposite arms of said bridge circuit and said last two resistors being connected in the other two arms of said bridge circuit, a bridge-balance-setting resistor of Constantan wire spirally wound on another of said rods and connected in such arm of said bridge circuit and having such a value of resistance that said circuit is balanced at some predetermined base pressure in said container, an impedance-matching resistor of Constantan wire spirally wound on one of said rods and connected across the excitation terminals of said bridge circuit and having its resistance value so selected as to provide standard predetermined look-in impedance to said bridge circuit from a source of excitation, a sensitivity-determining resistor of Constantan wire spirally wound on one of said rods and connected in series with one of the excitation terminals of said bridge circuit between it and said impedance-matching resistor and having a value of resistance so selected as to provide a predetermined bridge unbalance for a predetermined pressure value in said container, a resistor of nickel wire spirally wound on one of said rods so as to be exposed to substantially the same temperature as said strain gage resistors connected in series with said sensitivity-determining resistor and one of the excitation terminals of said bridge and having a resistance value selected so as to compensate for changes in sensitivity of said pressure responsive unit caused by changes in modulus of elasticity of the material of said tube due to changes in its temperature, and detachable connection means for connecting said interchangeable pressure responsive unit to a bridge balance determining device, whereby such a standard bridge balance device may be responsive to the pressures affecting many such pressure responsive units uniformly throughout all operating temperatures with respect to their predetermined base pressures without the need for adjusting said bridge balance device to the individual characteristics of each of such pressure responsive units when connected thereto.

14. A standardized interchangeable strain-gage-type condition sensitive unit, comprising, in combination, a member adapted to be strained in accordance with the changes in the value of a condition to be measured, mounting means for associating said member with said condition, four substantially identical resistance-type strain-gage elements, two of said elements being affixed to the surface of said member to be strained therewith, means affixing the other two of said elements to said mounting means to expose them to substantially the same temperature as said first two elements to act as temperature compensating elements, means connecting said four elements in a Wheatstone bridge type circuit with two opposite corners forming the excitation terminals and the other two opposite corners forming the balance-detecting terminals of said bridge circuit, said two condition responsive elements being connected in two opposite arms of said bridge circuit and said two temperature compensating elements being connected in the other two opposite arms of said bridge circuit, bridge-balance-setting resistance means of temperature-resistance coefficient substantially equivalent to that of said strain gage elements affixed to said mounting means and connected in such arm of said bridge circuit and having such value of resistance that said circuit is balanced at some predetermined base value of said condition, impedance-matching resistance means affixed to said mounting means and connected across the excitation terminals of said bridge circuit and having its resistance value so selected as to provide standard predetermined look-in impedance to said bridge circuit from a source of excitation, sensitivity-determining resistance means formed of material having a resistance-temperature coefficient of substantially zero value affixed to said mounting means and connected in series with one of the excitation terminals of said bridge circuit between it and said impedance-matching resistance means and having a value of resistance so selected as to provide a predetermined bridge unbalance for a predetermined change in the value of said condition, and detachable connection means for connecting said condition sensitive unit to a bridge balance determining device, whereby such a standard bridge balance device may be responsive to the changes in the conditions affecting many such condition sensitive units with respect to their predetermined base values without the need for adjusting said bridge balance device to the individual characteristics of each of said condition sensitive units when connected thereto.

15. A standardized interchangeable strain-gage-type condition sensitive unit comprising, in combination, a member adapted to be strained in accordance with changes in the value of a condition to be measured, mounting means for associating said member with said condition, four substantially identical resistance-type strain-gage elements, two of said elements being mechanically associated with the surface of said member to be strained therewith, means affixing the other two of said elements to said mounting means to expose them to substantially the same temperature as said first two elements to act as temperature compensating elements, means connecting said four elements in a Wheatstone bridge type circuit with two opposite corners forming the excitation terminals and the other two opposite corners forming the balance-detecting terminals of said bridge circuit, said two elements associated with said condition responsive member being connected in two opposite arms of said bridge circuit and said two temperature compensating elements being connected in the other two opposite arms of said bridge circuit, bridge-balance-setting resistance means of temperature-resistance coefficient substantially equivalent to that of said strain gage elements affixed to said mounting means and connected in such arm of said bridge circuit and having such value of resistance that said circuit is balanced at some predetermined base value of said condition, impedance-matching resistance means affixed to said mouting means and connected across the excitation terminals of said bridge circuit and having its resistance value so selected as to provide standard predetermined look-in impedance to said bridge circuit from a source of excitation, sensitivity-determining resistance means formed of material having a resistance-temperature coefficient of substantially zero value affixed to said mounting means and connected in series with one of the excitation terminals of said bridge circuit between it and said impedance-matching resistance means and having a value of resistance so selected as to provide a predetermined bridge unbalance for a predetermined change in the value of said condition, resistance means having a relatively high temperature-resistance coefficient affixed to said mounting means to be exposed to substantially the same temperature as said strain gage elements connected in series with said sensitivity-determining means and one of the excitation terminals of said bridge and having a resistance value and temperature-resistance coefficient selected so as to compensate for changes in sensitivity of said condition sensitive unit caused by changes in modulus of elasticity of the material of said member due to changes in its temperature, and detachable connection means for connecting said interchangeable condition sensitive unit to a bridge balance determining device, whereby such a standard bridge balance device may be responsive to the changes in the conditions affecting many such condition sensitive units uniformly throughout all operating temperatures with respect to their predetermined base values without the need for adjusting said bridge balance device to the individual characteristics of each of such condition sensitive units connected thereto.

16. A standard interchangeable strain-gage-type condition sensitive unit for measuring the value of a condition, comprising, in combination, a support, a flexible member attached to said support and adapted to be strained in accordance with the changes in the value of a condition to be measured, said support having mounting means for positioning the same to associate said flexible member with the condition to be measured, a plurality of relatively inflexible members of material substantially thermally equivalent to that of said flexible member mounted on said support in close proximity to said flexible member, four continuous filaments of material whose electrical resistance varies in accordance with its strain, two of said filaments being arranged on and affixed to the surface of said flexible member with their greatest length in the direction of maximum strain to be strained therewith due to stress therein caused by change in the value of said condition, the other two of said filaments being arranged in a substantially identical manner on the surface of one of said inflexible members, means connecting the four resistors thus formed in a Wheatstone bridge type circuit with the two opposite corners forming the excitation terminals and the other two opposite corners forming the balance-detecting terminals of said bridge circuit, said first two resistors being connected in two opposite arms of said bridge circuit and said last two resistors being connected in the other two arms of said bridge circuit, a bridge-balance-setting resistor of temperature-resistance coefficient substantially equivalent to that of said strain sensitive resistors affixed to one of said inflexible members and connected in such arm of said bridge circuit and having such a value of resistance that said circuit is balanced at some predetermined base value of said condition, an impedance-matching resistor affixed to one of said inflexible members and connected across the excitation terminals of said bride circuit and having its resistance value so selected as to provide standard predetermined look-in impedance to said bridge circuit from a source of excitation, a sensitivity-determining resistor made of material having a resistance-temperature coefficient of substantially zero value affixed to one of said inflexible members and connected in series with one of the excitation terminals of said bridge circuit between it and said impedance-matching resistor and having a value of resistance so selected as to provide a predetermined bridge unbalance for a predetermined change in the value of said condition, a resistor having a relatively high temperature-resistance coefficient affixed to one of said inflexible members so as to be exposed to substantially the same temperature as said strain sensitive resistors connected in series with said sensitivity-determining resistor and one of the excitation terminals of said bridge and having a resistance value and temperature-resistance coefficient selected so as to compensate for changes in sensitivity of said condition sensitive unit caused by changes in modulus of elasticity of the material of said flexible member due to changes in its temperature, and detachable connection means for connecting said interchangeable condition sensitive unit to a bridge balance determining device, whereby such a standard bridge balance device may be responsive to the changes in the conditions affecting many such condition sensitive units uniformly throughout all operating temperatures with respect to their predetermined base values without the need for adjusting said bridge balance device to the individual characteristics of each of such condition sensitive units when connected thereto.

17. A standardized interchangeable strain-gage-type pressure responsive unit, comprising, in combination, a hollow pressure chamber having an opening in one side thereof, mounting means for attaching said pressure chamber to a container in which pressure is to be measured so that the interior of said pressure chamber communicates with the interior of said container through said opening, a solid member of dimensions and material substantially equivalent to those of said pressure chamber secured to said mounting means in close proximity to said pressure chamber, four substantially identical resistance-type strain gage elements, two of said elements being affixed to the outer surface of said pressure chamber to be strained by stress produced in the walls of said chamber due to change in the differential pressure between the inside and outside of said chamber, to act as pressure responsive elements, the other two of said elements being affixed to the outer surface of said solid member so as to be subjected to substantially the same temperature as said first two elements to act as temperature conmpensating elements, and circuit means connecting said four elements in a Wheatstone bridge type circuit, said two pressure responsive elements being connected in opposite arms of said bridge circuit and said two temperature compensating elements being connected in the other two opposite arms of said bridge circuit, a balance-setting resistor connected between one of said pressure responsive elements and one of said temperature compensating elements, a sensitivity determining resistor, a modulus-change compensating resistor, an impedance matching resistor, circuit means connecting these three last-named resistors in series between one end of said balance-setting resistor and the opposite terminal of said bridge, detachable connection means for connecting a source of energizing potential across said impedance matching resistor and for connecting the opposite terminals of said bridge circuit to a bridge balance responsive device.

18. An electrical resistance strain-gage-type condition responsive unit, comprising, in combination, a member adapted to be strained in accordance with changes in the value of a condition, a Wheatstone bridge type circuit, an electrical resistance type strain gage element affixed to said member to be strained therewith and connected in one arm of said bridge circuit, first connection means through which an energizing potential may be applied across two opposite terminals of said bridge circuit, second connection means through which measuring means adapted to be responsive to the condition of balance of said bridge circuit may be connected to the other two terminals of said circuit for determining the value of said condition in terms of the unbalance of said circuit, a temperature sensitive resistor mounted in close thermal proximity to said member and connected in said first connection means in series with one of the energization terminals of said bridge circuit to reduce the energization thereof with increase in the temperature of said member, whereby the response of said unit is maintained substantially constant in spite of changes in sensitivity of said element caused by changes in the modulus of elasticity of said member due to changes in its temperature.

19. An electrical resistance strain-gage-type condition responsive unit, comprising, in combination, a member adapted to be strained in accordance with changes in the value of a condition, an electrical resistance-type strain gage element mechanically associated with said member to be strained therewith, a measuring circuit, means connecting said element in said measuring circuit to change the distribution of electrical potential therein in response to change in the value of the resistance of said element as a measure of the value of said condition, means for connecting to said measuring circuit a measuring instrument adapted to be responsive to the potential distribution of said measuring circuit for determining the value of said condition, circuit means for applying an energizing potential to said measuring circuit, a temperature sensitive resistor mounted so as to be exposed to the same operating temperature as said member, means interconnecting said resistor in said energizing circuit means to reduce the energization of said measuring circuit as the temperature of said member increases, whereby an increase in the sensitivity of said circuit with increase in the temperature of said member due to change in the modulus of elasticity of said member is compensated for by a decrease in the energization of said measuring circuit.

20. A standardized interchangeable strain-gage-type condition sensitive unit, comprising, in combination, a member adapted to be strained in accordance with the changes in the value of a condition to be measured, mounting means for associating said member with said condition, four substantially identical resistance-type strain-gage elements, two of said elements being affixed to the surface of said member to be strained therewith, means affixing the other two of said elements to said mounting means to expose them to substantially the same temperature as said first two elements to act as temperature compensating elements, means connecting said four elements in a Wheatstone bridge type circuit with two opposite corners forming the excitation terminals and the other two opposite corners forming the balance-detecting terminals of said bridge circuit, said two condition responsive elements being connected in two opposite arms of said bridge circuit and said two temperature compensating elements being connected in the other two opposite arms of said bridge circuit, impedance-matching resistance means affixed to said mounting means connected across the excitation terminals of said bridge circuit and having its resistance value so selected as to provide standard predetermined look-in impedance to said bridge circuit from a source of excitation, and detachable connection means for connecting said condition sensitive unit to a bridge balance determining device, whereby such a standard bridge balance device may be responsive to the changes in the conditions affecting many such condition sensitive units without the need for adjusting said bridge balance device to the individual characteristics of each of said condition sensitive units when connected thereto.

21. A standard interchangeable strain-gage-type pressure responsive unit for measuring the pressure in a container, comprising, in combination, a base having mounting means for securing the same to close a hole in said container, a tubular member having one closed end mounted on said base so that the hole in its other end communicates with the hole in said container, a plurality of solid cylindrical members of external dimensions and material substantially equivalent to those of the tubular member mounted on said base in close proximity to said tubular member, four continuous filaments of material whose electrical resistance varies in accordance with its strain, two of said filaments being wound spirally around and affixed to the surface of said tubular member to be strained with the walls thereof due to stress therein caused by change in the differential pressure between the inside and outside of said tubular member, the other two of said filaments being wound and affixed in a substantially identical manner to the surface of one of said solid members, means connecting the four resistors thus formed in a Wheatstone bridge type circuit with the two opposite corners forming the excitation terminals and the other two opposite corners forming the balance-detecting terminals of said bridge circuit, said first two resistors being connected in two opposite arms of said bridge circuit and said last two resistors being connected in the other two arms of said bridge circuit, an impedance-matching resistance element formed of material having a resistance-temperature coefficient of substantially zero value spirally wound on one of said solid cylindrical members and connected across the excitation terminals of said bridge circuit and having its resistance value so selected as to provide standard predetermined look-in impedance to said bridge circuit from a source of excitation, and detachable connection means for connecting said pressure responsive unit to a bridge balance determining device, whereby such a standard bridge balance device may be responsive to the pressures affecting many such pressure responsive units without the need for adjusting said bridge balance device to the individual characteristics of each of said pressure responsive units when connected thereto.

22. A standardized interchangeable strain-gage-type condition responsive unit, comprising, in combination, a member adapted to be strained in accordance with changes in the value of a condition, an electrical resistance-type strain gage element mechanically associated with said member to be strained therewith, a measuring circuit, means connecting said element in said measuring circuit to change the distribution of electrical potential therein in response to change in the value of the resistance of said element as a measure of the value of said condition, means for connecting to said measuring circuit a measuring instrument adapted to be responsive to the potential distribution of said measuring circuit for determining the value of said condition, energizing circuit means for applying an energizing potential from a suitable source to said measuring circuit, impedance-matching resistance means connected across said energizing circuit means and having its resistance value so selected as to provide standard predetermined look-in impedance to said measuring circuit from said energizing potential source, and detachable connection means for connecting said condition responsive unit to said potential distribution measuring instrument, whereby such a standard potential distribution measuring instrument may be responsive to the changes in the conditions affecting many such condition responsive units without the need for adjusting said measuring instrument to the individual characteristics of each of said condition responsive units when connected thereto.

WILFRED H. HOWE.

REFERENCES CITED

The following references are of record in the file of this patent:

UNITED STATES PATENTS

| Number | Name | Date |
| --- | --- | --- |
| 2,036,458 | Carlson | Apr. 7, 1936 |
| 2,059,549 | Carlson | Nov. 3, 1936 |
| 2,327,935 | Simmons | Aug. 24, 1943 |
| 2,344,642 | Ruge | Mar. 21, 1944 |
| 2,360,886 | Osterberg | Oct. 24, 1944 |
| 2,365,015 | Simmons, Jr. | Dec. 12, 1944 |